Figure 1:
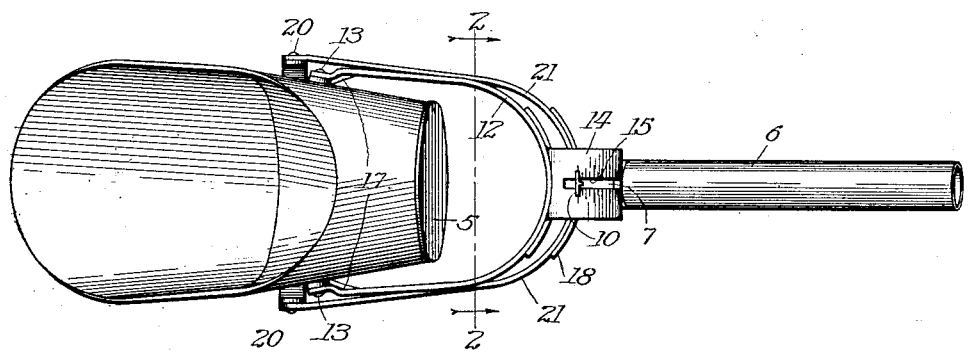

P. E. BERTRAM.
SELF WEIGHING SCOOP.
APPLICATION FILED MAR. 30, 1912.

1,058,713.

Patented Apr. 15, 1913.
2 SHEETS—SHEET 1.

Witnesses:
Robert H. Weir
Leo J. Dumais

Inventor
Paul E. Bertram
by Jno. G. Elliott
Atty.

P. E. BERTRAM.
SELF WEIGHING SCOOP.
APPLICATION FILED MAR. 30, 1912.
1,058,713.
Patented Apr. 15, 1913.
2 SHEETS—SHEET 2.
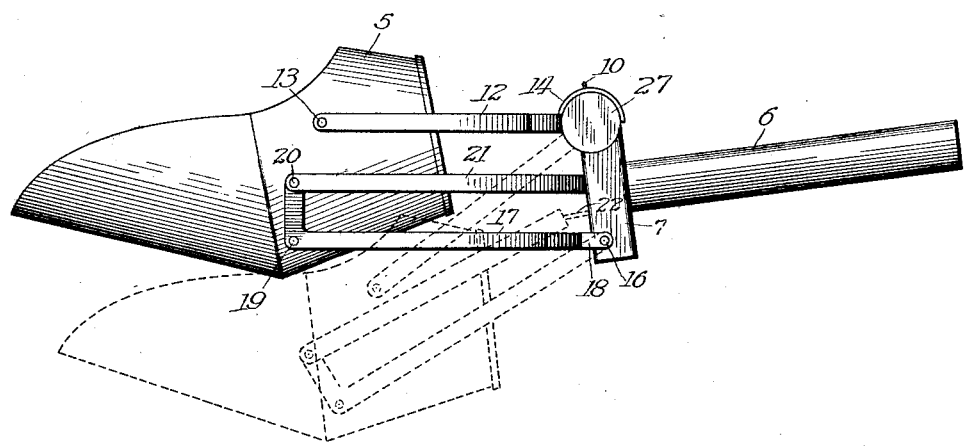
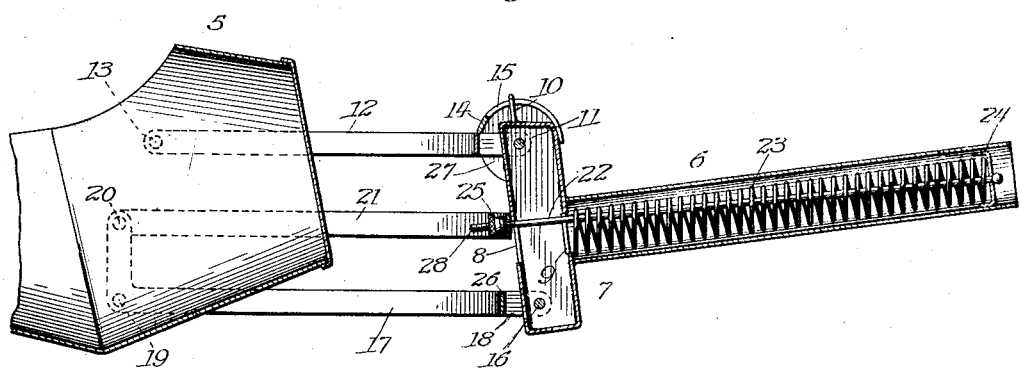

UNITED STATES PATENT OFFICE.

PAUL E. BERTRAM, OF CRYSTAL LAKE, ILLINOIS.

SELF-WEIGHING SCOOP.

1,058,713. Specification of Letters Patent. Patented Apr. 15, 1913.

Application filed March 30, 1912. Serial No. 687,356.

*To all whom it may concern:*

Be it known that I, PAUL E. BERTRAM, a citizen of the United States, and resident of Crystal Lake, in the county of McHenry and State of Illinois, have invented certain new and useful Improvements in Self-Weighing Scoops, of which the following is a full, clear, and exact specification.

This invention relates to improvements in self-weighing scoops, in which weighing scales are interposed between the body of the scoop and its necessary handle, are actuated by the gravity of the contents of the scoop for weighing the same, and in which heretofore the scoop structure must be tilted to a position unusual in handling the same in order to transmit the center of weight of its contents upon and against the scale.

The prime object of this invention broadly stated is a self-weighing scoop in which the gravity of the contents of the scoop is transmitted and centered upon the scales in every position of the scoop natural to its use in loading it, and while transferring it to the place of deposit of that load, as for example while lifting the scoop out of a barrel or bin from which it is loaded and throughout the manual movement natural to transferring it to a bag, box, table or other receptacle of deposit.

More specifically stated the object of my invention is a self-weighing scoop the connection between which and its scale is such that when the scoop is held by its handle and which is naturally horizontal, to prevent spilling its contents, such contents will actuate the scale and be weighed, and this while the pointer of the scale is in the most conveniently accessible position for visually indicating the same to the operator both when he is left handed and right handed.

Another object of my invention is to prevent the force resisted by the scoop on being pushed into the materials being loaded thereon from being transmitted to the scales to the strain or other injury thereof, or in other words to have the scoop so connected with the scale that such force is resisted by the handle structure to the substantial exclusion of the scale mechanism.

A still further object of my invention is to have such a connection between the scoop and a scale that on lifting the loaded scoop toward a slightly horizontal position, the scoop will descend and actuate the scales and also tend downwardly sufficient at its rear end to make a strike without spilling the desired and intended contents thereof.

Figure 2:
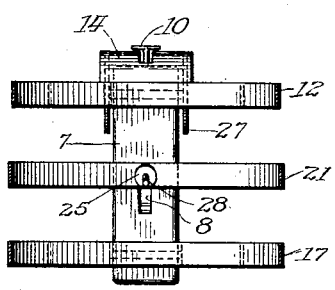

With these ends in view, my invention finds embodiment in certain features of novelty in the construction, combination and arrangement of parts by which the said objects and certain other objects are hereinafter attained, all as fully described with reference to the accompanying drawings, and more particularly pointed out in the claims:

In said drawings: Figure 1 illustrates a top plan view of a self-weighing scoop in which my invention finds embodiment. Fig. 2 is a detail section on the line 2—2 of Fig. 1. Fig. 3 is a side elevation of my self-weighing scoop with dotted lines indicating the position of the scoop when loaded, and Fig. 4 is a longitudinal section thereof with the point of the scoop broken away.

Similar characters of reference indicate the same parts in the several figures of the drawings.

The scoop 5 is of the form commonly and generally used and best adapted for pushing it into and loading it with dry, or substantially dry materials until transferred from one storage receptacle to another, or to a bag or sheet of paper subsequently converted into a package delivered to a user, and ordinarily provided with a handle secured directly to the rear and closed end of the scoop. For the purposes of my invention, however, is employed a handle 6 which is hollow and at its end adjacent the scoop and is provided with a hollow post 7 in which are opposing slots 8 and 9 registering with each other, and with the bore of the handle for the purpose hereinafter described, the post being preferably closed at both ends with a pointer 10 projecting from the upper end.

Pivotally secured toward the upper end of the post 7 by means of a pivot or rivet 11 is a U-shaped link 12, the free ends of which are pivotally secured at opposite sides of the scoop by means of pivots or rivets 13 situated well toward the top of and forward of the rear end of the scoop to the rear end of which link is secured a semi-circular plate 14, provided with a slot 15 and having gage marks thereon coöperating with the pointer 10 with reference to which the plate is movable when the scoop is elevated and depressed as hereinafter described. Pivotally secured by means of a pivot or rivet 16 toward the lower end of the post is a bell crank lever 17 provided with parallel lugs 18 straddling the post and mounted on the pivot 16, which for this purpose may consist of a single pivoting rod instead of separate pivots or rivets for each arm. Bell crank lever 17 is also of U-shaped form and has its free ends pivoted at opposite sides of the scoop by means of pivots or rivets 19 located well toward the bottom of the scoop somewhat farther forward from the rear end thereof than the pivot 13 for the link 12.

The short arm of the bell crank projects upwardly from the pivot 19 and by means of pivots or rivets 20 is secured to the free ends of a U-shaped tension link 21, and so called for the reason that it furnishes a direct connection between the scoop and a scale rod 22 coöperating with a spring 23 in the handle 6 of the scoop, and to which end the outer end of the rod has thereon a cap 24 free to reciprocate in the handle both when the spring is expanded and contracted as hereinafter described. Scale rod 22 projects through the slots 8 and 9 in the post and through the tension link 21, and is provided with a thumb nut 25 bearing against the tension link for adjusting and taking up wear in the spring 23, the slots 8 and 9 being of sufficient length to permit a lateral movement of the scale rod therein to the limit of the movement of the tension link 21 to accommodate the extreme movements of the scoop and the bell crank lever to which it is pivoted.

When the scoop is empty the tension link 21 abuts against the post 7 and is substantially in line with the handle 6, while at the same time the link 12 and long arm of the lever 17 are parallel to each other and with the tension link 21 and the pointer 10 opposite the zero mark on the scale plate 14.

With the several parts in the arrangement above described it will be seen that the line of force forming pressure on the handle tending to force the scoop into a mass of material for receiving its load is against opposite sides of the post, that is to say on one side by the handle and on the other by the tension link 21, and on a line extending through the pivot 20, the result being that the scoop can be pushed into the material in a direct line and on lines through the structure best adapted to resist back pressure thereon, and that the connections between the scoop and the handle are accordingly stiffened and rigid. Immediately, however, the loaded scoop is retracted from its source of supply for its load, it will be depressed below its normal position, and if the weight of the load is sufficient, to the point indicated by the dotted lines in Fig. 3, in which position the link 12, the tension link 21 and the long arm of the lever 17 will then be projected downwardly at an oblique angle to the post and out of parallelism with each other, which downward movement of the link is limited by the engagement of the curved side 26 of the long arm of the lever 17 with the post if not before by the limit of the compression of the spring 23 in its coöperation with the tension link 21, and may be to some extent or wholly, if desired, by the engagement of the pointer with the end wall of the slot in the gage plate in which it works.

Whether the load of the scoop is greater or less, its weight will be accurately indicated by the pointer on the scale which together with the pointer is preferably made duplex for the convenience of both right hand and left hand operators of the scoop, and in this connection it should be observed that the position of the loaded scoop during its natural handling by the operator is such that the pointer and the dial are within easy visual range of the operator for the time the scoop is depressed by its load until tilted by the operator for discharging the same.

As shown in the drawings the otherwise open ends of the scale plate are closed by caps 27 which, being fastened to the link 12 and the end of the scale plate serve as an additional means for supporting the scale plate.

As a means for limiting the downward movement of the scoop between its link and lever supports, the rod 22 of the scale may be projected as shown at 28, and thereby form a stop for the scoop and in practice this is preferably done to the exclusion of any other stop therefor.

Having described my invention, what I claim and desire to secure by Letters Patent is:

1. A self-weighing scoop comprising in combination a handle structure, a scoop, link and lever connections between said scoop and handle structure, a spring scale, the spring of which is inclosed by said handle and flexibly connected with the scoop, a fixed pointer mounted on the handle in a plane parallel to the axis of the spring, and a movable scale plate actuated by the movement of the scoop, substantially as described.

2. A self-weighing scoop comprising in combination a scoop, a handle therefor, a pivoted connection including a bell crank lever for said scoop and handle, a weighing scale the spring of which is inclosed by said handle and connected with said bell crank, a pointer rigidly connected with the handle, and a dial secured to one of the pivoted connections between the handle and the scoop.

3. A self-weighing scoop comprising in combination a hollow handle, a scale spring confined therein, a scoop, a bell crank lever pivotally connected with the handle and pivoted to the scoop, a link connection between said bell crank and spring, another link pivoted to the scoop and pivotally connected with the handle, a scale plate supported by said link and a fixed pointer cooperating with said scale plate, substantially as described.

4. A self weighing scoop comprising in combination a hollow handle, a hollow upright post secured thereto, a link pivoted directly to said post and scoop, a bell crank pivoted to the lower end of said post and the scoop, a link pivoted to said bell crank, and an adjustable connection between the opposite end of said link and the spring, substantially as described.

In witness whereof, I have hereunto set my hand and affixed my seal, this 23 day of March A. D. 1912.

PAUL E. BERTRAM. [L. S.]

Witnesses:
  OTTO WOLLENBERG,
  HUGH H. PARKS.

Copies of this patent may be obtained for five cents each, by addressing the "Commissioner of Patents, Washington, D. C."